United States Patent [19]

Drzewinski

[11] Patent Number: 5,280,070
[45] Date of Patent: Jan. 18, 1994

[54] POLYCARBONATE-POLYMETHYL METHACRYLATE BLENDS

[75] Inventor: Michael A. Drzewinski, Princeton Junction, N.J.

[73] Assignee: Enichem S.p.A., Milan, Italy

[21] Appl. No.: 891,182

[22] Filed: Jun. 1, 1992

[51] Int. Cl.[5] .................. C08L 69/00; C08L 33/12
[52] U.S. Cl. ..................................... 525/148; 525/133
[58] Field of Search .................... 525/57, 133, 148

[56] References Cited

U.S. PATENT DOCUMENTS

| | | | |
|---|---|---|---|
| 3,103,503 | 9/1963 | Fox | 526/329.7 |
| 4,319,003 | 3/1982 | Gardlund | 525/148 |
| 4,743,654 | 5/1988 | Kyu et al. | 525/148 |
| 4,745,029 | 5/1988 | Kambour | 525/148 |
| 5,106,906 | 4/1992 | Meier | 525/148 |

FOREIGN PATENT DOCUMENTS

| | | |
|---|---|---|
| 0297285 | 1/1989 | European Pat. Off. . |
| 2264268 | 7/1973 | Fed. Rep. of Germany . |
| 3632946 | 3/1988 | Fed. Rep. of Germany . |
| 3833218 | 4/1990 | Fed. Rep. of Germany . |
| 47-16063 | 5/1972 | Japan . |

OTHER PUBLICATIONS

Recent Advances in Mechanistic and Synthetic Aspects of Polymerization, pp. 79–100, T. E. Long, et al., "Controlled Synthesis of Various Poly(Alkyl Methacrylates) by Anionic Techniques".

Polymer, vol. 32, No. 2, pp. 272–278, 1991, M. Nishimoto, et al., "Role of Slow Phase Separation in Assessing the Equilibrium Phase Behavior of PC PMMA Blends".

Polymer Preprints, vol. 23, No. 1, pp. 258–259, Mar. 1982, Z. G. Garlund, "Thermal and Dynamic Mechanical Analysis of Polycarbonate/Poly(Methyl Methacrylate) Blends".

Advances in Chemistry, vol. 206, No. 9, pp. 129–148, 1984, Z. G. Garlund, "Properties and Morphology of Poly(Methylacrylate),Bisphenol A Polycarbonate Blends".

J. Amer. Chem. Soc., vol. 80, pp. 1768–1769, 1958.

Polymer Letters, vol. 3, pp. 1053–1058, 1965, H. Abe, et al., "Syndiotactic Polymerization of Methyl Methacrylate (1)".

Macromolecules, vol. 14, pp. 1599–1601, 1981, B. C. Anderson, et al., "Anionic Polymerization of Methacrylates, Novel Functional Polymers and Copolymers".

Recent Advances in Merchanistic and Synthetic Aspects of Polymerization, pp. 101–117, 1987, R. Jerome, et al., "The Anionic Polymerization of Alkyl Acrylates: A Challenge".

Polymer Bulletin, vol. 20, pp. 505–510, 1988, T. Kitayama, et al., "Highly Syndiotactic Poly(Methyl Methacrylate) with Narrow Molecular Weight Distribution formed by Tert-Butyllithium-Trialkylaluminium in Toluene".

Encyclopedia of Polymer Science and Engineering, Second Edition, vol. 2, pp. 31–35 & pp. 280–286.

*Primary Examiner*—David J. Buttner
*Attorney, Agent, or Firm*—Oblon, Spivak, McClelland, Maier & Neustadt

[57] ABSTRACT

Polycarbonates can be blended with 1–99% of polymethyl methacrylate (PMMA) polymers in which at least 60% of the monomer units are in the syndiotactic configuration to form thermodynamically miscible, single phase, transparent blends at all compositions.

7 Claims, 3 Drawing Sheets

POLYCARBONATE-POLYMETHYL METHACRYLATE BLENDS

BACKGROUND OF THE INVENTION

Field of the Invention

This invention pertains to mixtures of polycarbonates (PC) and stereoregular polymethyl methacrylates in which at least 60% of the monomer units are in the syndiotactic configuration (s-PMMA). Blends of PC and s-PMMA result in thermodynamically miscible, single phase systems which are transparent in all ratios.

Discussion of the Background

Blends of polycarbonates and polymethyl methacrylates are known. Generally, polycarbonates exhibit properties such as high temperature stability, good dimensional stability, high impact strength, good stiffness and most notably good transparency. For these reasons, PC is used in a variety of applications including glass replacement, housings, medical devices and containers. Nevertheless, PC does have drawbacks such as poor scratch resistance, poor long-term U.V. resistance and stress birefringence which have to be dealt with, particularly in demanding optical applications.

Polymethyl methacrylates, on the other hand, are limited by their relatively poor dimensional stability, low impact strength and low temperature stability. They are, however, known for their clarity, surface hardness, U.V. resistance and generally good weatherability and chemical resistance. For this reason, they are extensively used in applications such as window glazings, aircraft windows and automobile lenses/lightcovers.

Blends of PC and PMMA would therefore be expected to eliminate the individual deficiencies of the respective components and result in a material having considerably improved mechanical and optical properties for a wide range of applications. Unfortunately, blends of PC and typical polymethyl methacrylates are not thermodynamically miscible at most compositions and their mixtures result in opaque materials which are not acceptable for transparent, optical applications. The technical literature has previously debated the miscibility of these mixtures with the current understanding (see *Polymer*, Volume 32, page 272, 1991) that traditional, free-radically polymerized PMMA does not form a single, thermodynamically miscible, transparent blend but does demonstrate mechanical compatibility with PC.

The term "thermodynamically miscible" refers to a polymer blend that is mixed on the molecular level forming a single, homogeneous phase which exhibits only one glass transition. In contrast, the term "mechanically compatible" is taken to mean that mixing of the polymers is on a small scale but larger than the molecular level. Furthermore, "mechanically compatible" implies that the multiple phases exhibits good adhesion to one another so as to yield good mechanical properties. Although both thermodynamically miscible and mechanically compatible blends exhibit good mechanical properties, thermodynamically miscible blends will generally be stronger, and only thermodynamically miscible blends are transparent, owing to their single phase nature.

Many references now exist which describe mixtures of PC and PMMA as immiscible in most proportions. For example, U.S. Pat. No. 4,319,003 teaches that blends of PC and PMMA are opaque and do not possess the advantageous properties exhibited by either polymer. In *Polymer Preprints*, Volume 23, pages 258–259, 1982 and in Advances in Chemistry, Volume 206, Number 9, pages 129–148, 1984, indications of immiscibility in all typical PC/PMMA blends are reported; as a matter of fact, these blends were observed to be opaque over the entire composition range. Among several other references which confirm the hereinabove mentioned immiscibility are JP 7216063 and EP 0297285.

Ways of overcoming the drawbacks associated with the immiscibility of typical PC/PMMA blends have been previously proposed. Among them, the addition of copolymer additives (DE 2264268); PMMA/acrylamide copolymers (DE 3632946); and PMMA-ester copolymers containing carboxylic groups (U.S. Pat. No. 4,906,696). In U.S. Pat. No. 4,319,003, the use of a block copolymer of PC and PMMA instead of a physical mixture of the two components is proposed.

Similarly, processes have been developed and proposed which can also produce transparent PC/PMMA blends. According to DE 3,833,218, transparent mixtures of aromatic polycarbonates and polyalkyl methacrylates can be produced by melting the two components in the presence of a supercritical gas. Also, U.S. Pat. Nos. 4,743,654 and 4,745,029 disclose that one may produce solutions of the two polymers in organic solvents, allow the organic solvent to evaporate and thus produce a transparent material. Unfortunately all of these methods suffer from the drawback of bubble formation and other imperfections in the final product which would render them unsuitable for many applications. Since care must be taken in such processes, these methods most certainly would be relatively slow in comparison to traditional melt forming processes such as all forms of extrusion and molding, and most likely would be limited to thin films as opposed to larger, more bulkier articles. A further disadvantage could be deterioration of properties and breakage arising from separation of the two phases since a blend produced by such processes would be metastable.

Accordingly the task existed of discovering and producing transparent PC/PMMA blends which exhibit all of the beneficial properties expected of such a mixture. Such a blend should be processable by known melt processing techniques and consist of a particular type of PMMA that assures compatibility and miscibility between the components throughout the whole range of compositions and thus overcomes the disadvantages mentioned hereinabove.

SUMMARY OF THE INVENTION

It is an object of this invention to provide a thermoplastic, melt processable composition which is a mechanically compatible, single phase, transparent blend of polycarbonate and polymethyl methacrylate.

It is another object of this invention to prepare blends of polycarbonate and polymethyl methacrylate in which these two polymers are thermodynamically miscible and form a stable, single phase material at all compositions.

DETAILED DESCRIPTION OF THE PREFERRED EMBODIMENTS

Figure 1:
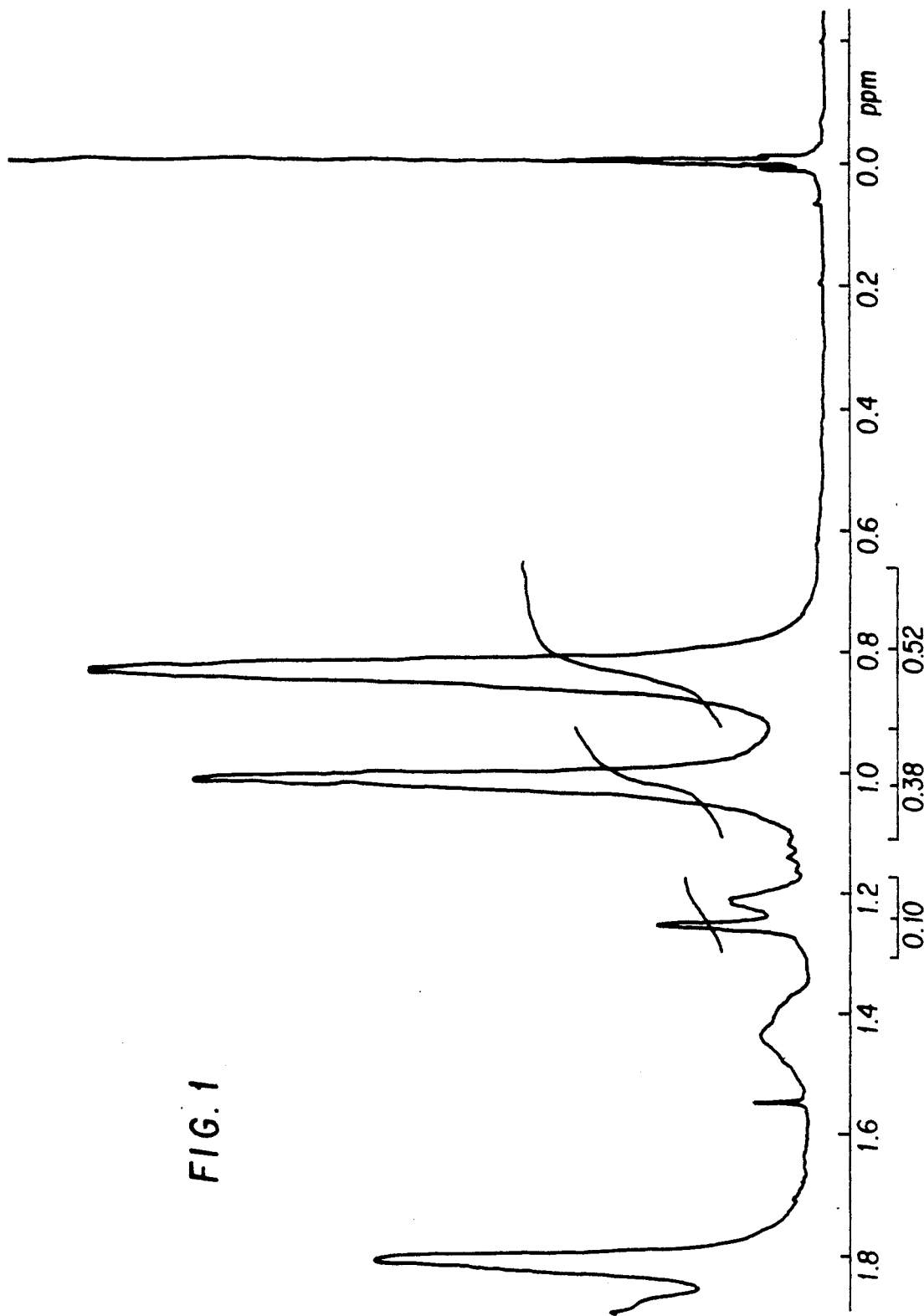
FIG. 1 is a 300 MHz NMR spectrum of atactic PMMA.
Figure 2:
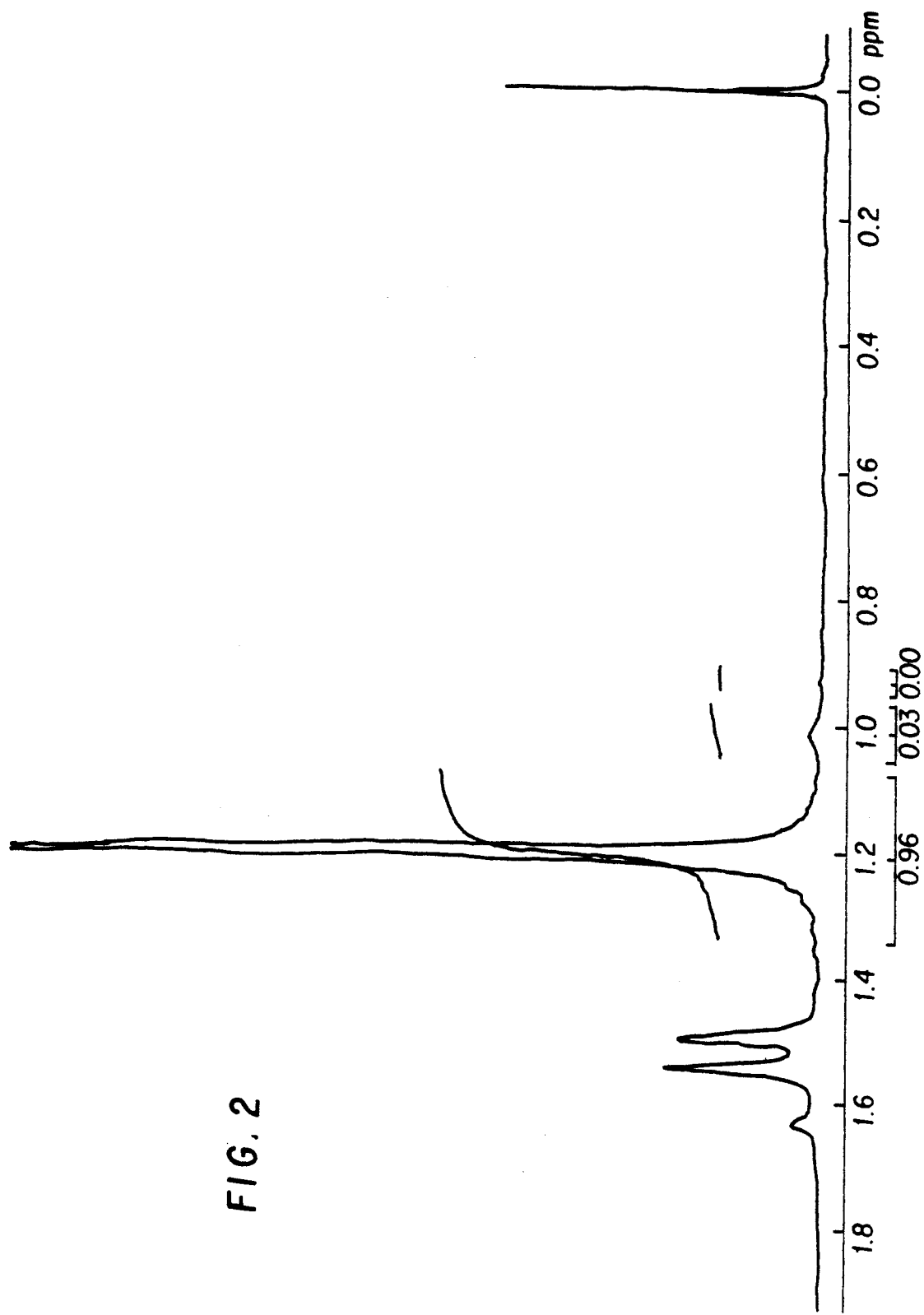
FIG. 2 is a 300 MHz NMR spectrum of isotactic PMMA.
Figure 3:
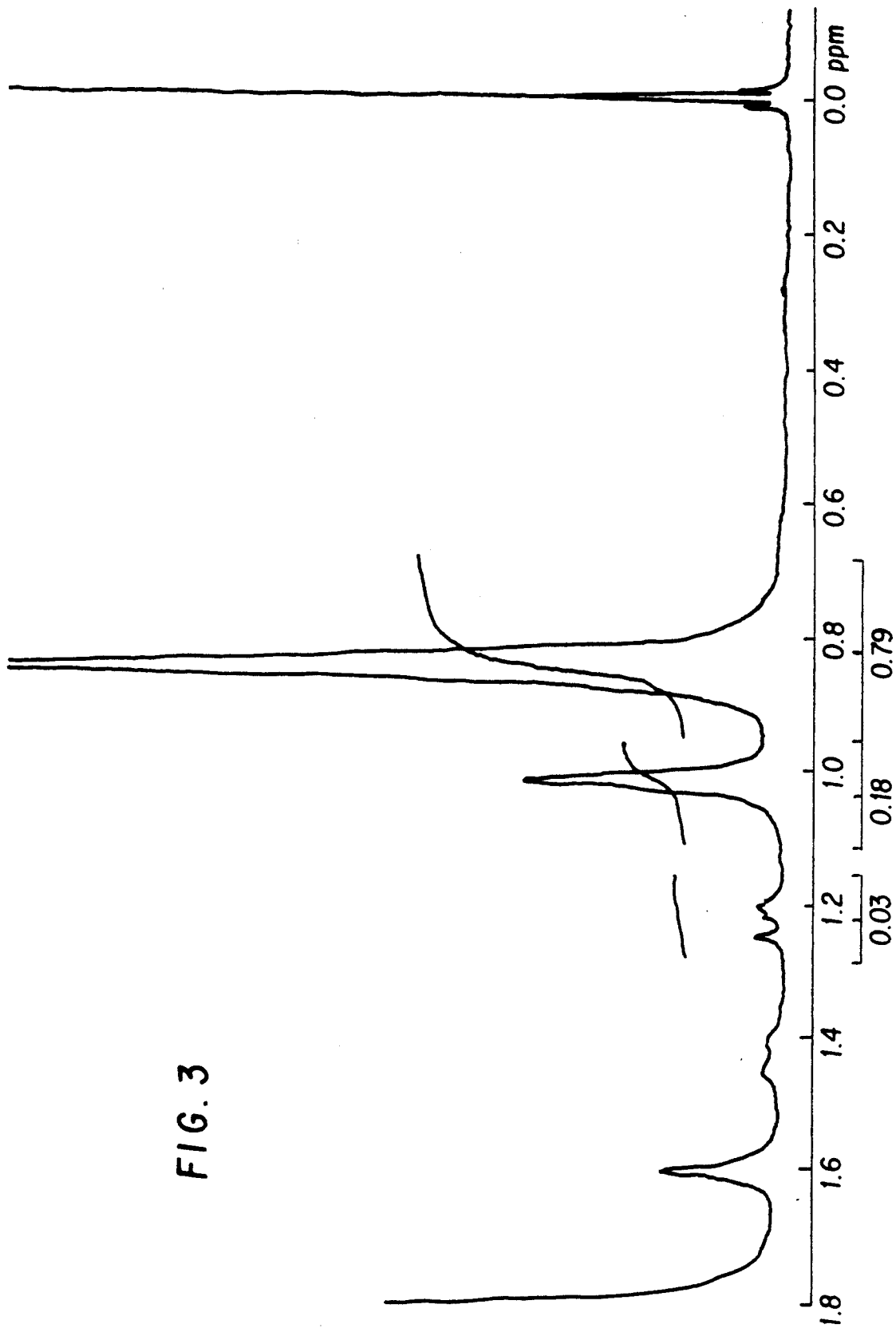
FIG. 3 is a 300 MHz NMR spectrum of syndiotactic PMMA.

It is possible to obtain transparent and completely miscible blends containing:

(I) 1 to 99 weight % of an aromatic polycarbonate having the formula

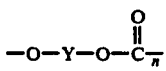

wherein Y is a radical of formula

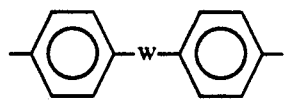

W is a $C_1$–$C_6$ straight or branched alkyl, carbonyl, single bond, sulfonyl, oxygen or sulphur group; n is an integer between 10 and 30,000 preferably between 100 and 10,000; and (II) 99 to 1 weight % of a syndiotactic polymethyl methacrylate (s-PMMA) wherein at least 60% of all methacrylate units are in the syndiotactic configuration, preferably at least 70%, and most preferably at least 90%.

Polymethyl methacrylates endowed with the syndiotactic configuration are already known in the art. As a matter of fact it has been previously disclosed. (*J. Am. Chem. Soc.*, Volume 80, pg 1768, 1958) that three types of PMMA can be produced using organolithium catalysts in various reaction media possessing different solvating power. Generally, the syndiotactic configuration was achieved in highly polar conditions at low temperatures. Similarly, highly syndiotactic PMMA was also reported to be made with a Ziegler-type catalyst (TiCl$_4$+AlR$_3$) below 0° C. (*J. Polym. Sci. Letters*, Volume 3, page 1053, 1965). Overall, the 1960's saw considerable work done in the area of stereoregular polymerization of PMMA, primarily with the interest of understanding how solvent, temperature and initiator type effect the overall configuration.

More recently, modified anionic methods have been reported which yield higher quality s-PMMA in terms of narrower molecular weight distribution, molecular weight control and color. The use of a pyridine/n-butyl lithium complex is reported in *Macromolecules*, Volume 14, pages 1599–1601, 1981. The resultant s-PMMA polymer, however, yellowed upon heating to 100 C. This article also discloses a similar polymer prepared with a diphenyl ethylene/n-butyl lithium initiator which did not become yellow at elevated temperatures.

Chelating agents, such as dibutyl magnesium, diethyl zinc and lithium chloride have also been reported to give high quality s-PMMA (*Recent Advances in Mechanistic and Synthetic Aspects of Polymerization*, pages 101–117, 1987). One of the highest yields of narrow molecular weight s-PMMA has been reported to be made from a t-butyl lithium/trialkyl aluminum system in toluene (*Polymer Bulletin*, Volume 20, pages 505–510, 1988). Such a material can have a syndiotactic content of over 95%.

The tacticity of the PMMA's is determined by the triad composition ratios. An isotactic triad has two successive meso placements (denoted mm); syndiotactic two successive racemic placements (denoted rr); and atactic or heterotactic is denoted as mr or rm. Thus, random probability would yield a triad composition of:

$$\frac{i}{1} : \frac{a}{2} : \frac{s}{1}$$
$$(25\%) \quad (50\%) \quad (25\%)$$

since mr and rm are equivalent to mm and rr in probability.

I have tested a number of PMMA's with syndiotactic contents ranging from 5 to 92% as measured by NMR, which were synthesized by various routes. The PMMA's of particular interest (greater than 60% syndiotactic character) were either synthesized by one of the modified anionic methods mentioned above or were commercially available from Polysciences, Inc., Warrington, Pa.

The number average molecular weight of the s-PMMA used for this invention may be in the range of 10,000 to 2 million but more typically in the 30,000 to 300,000 range, although the specific molecular weight of s-PMMA is not critical to the basis of this invention.

Suitable aromatic polycarbonates are homo- or copolycarbonates and mixtures thereof. The polycarbonates are produced by reacting di-(monohydroxyaryl)-alkanes or dihydroxybenzenes and halogen substituted derivatives thereof with derivatives of carbonic acid such as carbonic acid diesters, phosgene, bis-chloro-carbonic acid esters of di(monohydroxyaryl)-alkanes, the bis-chloro-carbonic acid esters of dihydroxybenzenes and their substituted derivatives. These polymers can be manufactured by known processes as described in U.S. Pat. No. 4,548,997.

Examples of Y in the polycarbonate formula include 2,2-bis(4-hydroxyphenyl)propane, bis-(4-hydroxyphenyl)methane, 2,2-bis(4-hydroxy-3-methylphenyl)-propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane and (3,3'-dichloro-4,4'-dihydroxyphenyl)methane.

Aromatic polycarbonates are typically prepared using a molecular weight regulator, an acid acceptor and a catalyst. The molecular weight regulators which can be employed include phenol, cyclohexanol, methanol and para-tert-butylphenol. The acid acceptor can be either an organic or an inorganic base. Suitable organic bases include alkyl and aromatic amines such as pyridine, triethylamine, dimethylaniline and tributylamine. Suitable inorganic bases include the hydroxides, carbonates, bicarbonates and phosphates of alkaline or alkaline earth metals.

The catalysts which can be employed are those that promote esterification of the hydroxy monomer with the carbonic acid derivative, including tertiary amines, such as triethylamine, triisopropylamine, N,N-dimethylaniline; quarternary ammonium compounds, such as tetraethylammonium bromide and benzyltrimethylammonium chlorides; and quarternary phosphonium compounds such as N-butyltriphenylphosphonium bromide.

The preferred polycarbonates are produced with a bisphenol such as 2,2-bis-(4-hydroxyphenyl)propane, more commonly known as bisphenol A. Polycarbonates of the bisphenol A type are commercial products known, for example, as Makrolon (Mobay Corporation), Lexan (General Electric Corporation) and Sinvet (En. Chem). The number average molecular weights of suitable polycarbonates are on the order of 10,000 to 200,000 but more preferably in the 20,000 to 100,000 range with a relative viscosity of 1.0 to 1.5 (0.5 weight % in methylene chloride at 25° C.).

The preferred polymer blends of this invention are binary blends of PC and s-PMMA in which at least 50% of the monomer units of the PMMA are in the syndiotactic configuration. The scope of this invention also includes obvious extensions such as copolymers (random, graft, block, etc.) of s-PMMA which contain sufficient s-PMMA content to form a thermodynamically miscible blend with the polycarbonate. Suitable comonomers include butadiene, isoprene, butylacrylate and other elastomeric components which increase toughness.

Conventional additives such as fillers, impact modifiers, stabilizers, antioxidants and the like may be used. Antioxidants include phenolics, hindered amines, thioesters, and phosphite compounds. Suitable dyes, pigments and special color concentrates include a wide variety of chemical compounds, both organic and inorganic. Leading suppliers include Ferro, Harwick, Ciba-Geigy and Crowley.

Flame retardants include aluminum hydrates, halogenated compounds, antimony trioxide and phosphate esters. Ultraviolet stabilizers are generally of the benzophenone, benzotriazol or nickel-organic types and are sold by Ciba-Geigy, BASF, Ferro and American Cyanamid.

Suitable fillers include aramid fibers, glass fibers, ceramic fibers, metal fibers, carbon fibers, glass beads, minerals such as calcium carbonate, kaolin, talc, micas and silicas.

Impact modifiers include MBS modifiers sold by Rohm and Haas and AtoChem for use in PVC, PC and nylon. PC's are commercially impact modified with either the MBS or Kraton materials.

In order to maintain the transparent nature of this invention, such additives must also be miscible with the polymers. However, one may choose to give up the benefit of transparency for greater improvement in some other property, such as impact strength or tensile strength, through the use of a non-miscible additive. Thus, any polymer blend consisting essentially of PC and s-PMMA is within the scope of this invention. Typically, additives will not exceed 20 wt. % of the total of all materials.

The mixing of the components of this invention can be undertaken by many means such as codissolution in solvent and various forms of mechanical and thermal processing such as roll mixers, blade mixers, screw extruders and the like. The resultant blend can be further processed/shaped by similar methods most commonly known as extrusion and molding.

The resultant blends are a transparent thermoplastic material with a wider range of properties, in particular more favorable properties, than those exhibited by either individual component alone. For example, the thermoplastic processing of high melt viscosity, commercial PC can be facilitated by the use of s-PMMA without substantially altering other properties of PC, which is known to occur when typical plasticizers are used.

The blends of the present invention have many commercial applications as a result of the incorporation of miscibility between s-PMMA and its copolymers with PC. These include production of s-PMMA copolymers to incorporate other moieties into polycarbonate, such as functionality for further reactivity, or elastomers for low temperature, thick section toughness. Suitable comonomers include butadiene, isoprene, $C_1$–$C_{10}$ alkyl acrylates, vinyl acetate, vinyl alcohol, vinylidene chloride, diethyl fumarate and dimethyl maleate. Thus, through this discovery, one can modify polycarbonate in order to overcome inherent deficiencies such as notch sensitivity, poor thick section toughness and poor chemical resistance.

Other features of the invention will become apparent in the course of the following descriptions of exemplary embodiments which are given for illustration of the invention and are not intended to be limiting thereof.

EXAMPLE 1

Polycarbonate (Aldrich Chemical Co.) was solution blended in chloroform with 79% syndiotactic content polymethyl methacrylate [i: a: s=3%: 18%: 79%] (Polysciences, Inc.) at various weight ratios and each blend coagulated into isopropanol, filtered and dried under vacuum at 80° C. for several hours. Each blend was then tested by differential scanning calorimetry (DSC) after first being heated to 275° C. to remove any non-equilibrium effects and to simulate melt blending. Compression molded films of these mixtures were highly transparent to the eye. The DSC was run from 25° to 275° C. at 20° C./minute and the glass transition of the mixtures recorded. The results are contained in Table 1. The single glass transition exhibited by these blends is consistent with well known behavior for thermodynamically miscible polymer blends.

EXAMPLE 2

Syndiotactic PMMA was synthesized by a procedure previously reported (*Macromolecules*, Volume 14, pages 1599–1601, 1981) and analyzed by NMR and DSC. The material has a syndiotactic content of 92% [i: a: s=2:6: 92] and a glass transition of 132° C. This s-PMMA was then solution blended with polycarbonate (Aldrich), recovered, and tested as in Example 1. The resultant blends exhibited single Tg's as a function of s-PMMA content and were highly transparent when compression molded. The DSC results are tabulated in Table 1.

EXAMPLE 3

Part of the s-PMMA (30 grams), prepared in Example 2, was also dry blended with Lexan 141 Polycarbonate (GE Plastics) (70 grams) and melt blended using a CSI Mini-Max extruder. The resultant blend was then chopped and injected molded into small test pieces using a lab scale injector molder (Mining & Chemical Products). The resulting pieces were transparent and water white in appearance. DSC revealed a single glass transition of 140° C.

COMPARATIVE EXAMPLE I

Polycarbonate (Aldrich) and free radically polymerized, atactic PMMA [i: a: s=10:38:52] (Scientific Polymer Products) were solution blended, recovered and tested as in Example 1. The resultant blends were opaque when compression molded and exhibited two glass transitions as measured by DSC. The DSC results are contained in Table 1.

TABLE 1

| PC/PMMA | Example 1 | Example 2 | Example 3 | Comparative Example 1 |
|---|---|---|---|---|
| 100/0 | 150° | 150° | 147° | — & 150° |
| 85/15 | 148° | 147° | — | 115° & 147° |
| 70/30 | 144° | 142° | 140° | 118° & 149° |
| 60/40 | 142° | 141° | — | 117° & 149° |
| 40/60 | 136° | 135° | — | 119° & 148° |
| 30/70 | 134° | 134° | — | 117° & 148° |
| 15/85 | 130° | 132° | — | 116° & 147° |
| 0/100 | 129° | 132° | 132° | 111° & — |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A composition comprising a thermodynamically miscible blend of:

(I) 10 to 90 weight % of an aromatic polycarbonate of the formula

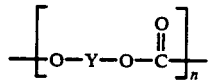

where Y is a radical of formula

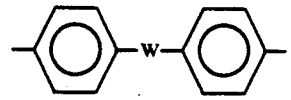

W is a $C_1$–$C_6$ straight or branched alkyl, carbonyl, sulfonyl, oxygen, sulfur or single bond, n is an integer between 10 and 30,000; and (II) 90 to 10 weight % of the syndiotactic polymethyl methacrylate (s-PMMA) wherein at least 50% of all methyl methacrylate units are in the syndiotactic configuration, wherein said composition has been melt blended and said blend of components (I) and (II) has only one Tg.

2. The composition of claim 1 wherein Y is bisphenol A.

3. The composition of claim 1 wherein at least 60% of all methyl methacrylate units are in the syndiotactic configuration.

4. The composition of claim 1 comprising 35–90% of component (I).

5. The composition of claim 1 wherein said s-PMMA has a molecular weight of 30,000–300,000.

6. The composition of claim 1 wherein said aromatic polycarbonate has a molecular weight of 20,000–100,000.

7. The composition of claim 1 wherein at least 90% of methyl methacrylate units are in the syndiotactic configuration.

* * * * *